United States Patent
Ramalingam et al.

(10) Patent No.: US 8,249,302 B2
(45) Date of Patent: Aug. 21, 2012

(54) METHOD FOR DETERMINING A LOCATION FROM IMAGES ACQUIRED OF AN ENVIRONMENT WITH AN OMNI-DIRECTIONAL CAMERA

(75) Inventors: Srikumar Ramalingam, Cambridge, MA (US); Matthew Brand, Newton, MA (US); Sofien Bouaziz, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 711 days.

(21) Appl. No.: 12/495,655

(22) Filed: Jun. 30, 2009

(65) Prior Publication Data
US 2010/0329542 A1     Dec. 30, 2010

(51) Int. Cl.
*G06K 9/00* (2006.01)
(52) U.S. Cl. ........ 382/104; 382/153; 382/154; 382/291; 701/28; 348/116; 348/148; 340/995.28
(58) Field of Classification Search .................. None
See application file for complete search history.

(56) References Cited

U.S. PATENT DOCUMENTS

| | | | | |
|---|---|---|---|---|
| 2006/0177101 | A1* | 8/2006 | Kato et al. | 382/106 |
| 2008/0075357 | A1* | 3/2008 | Yoon et al. | 382/153 |
| 2008/0232678 | A1* | 9/2008 | Yoon et al. | 382/153 |
| 2011/0035054 | A1* | 2/2011 | Gal et al. | 700/258 |

OTHER PUBLICATIONS

Hays et al., "Im2gps: estimating geographic images," CVPR, 2008.
Robertson et al., "An image-based system for urban navigation," BMVC, 2004.
Yeh et al., "Searching the web with mobile images for location recognition," CVPR, 2004.
Zhang et al., "Image based localization in urban environments," 3DPVT, 2006.
Meguro et al., "Development of positioning technique using omni-directional IR camera and aerial survey data," Advanced Intelligent Mechatronics, 2007.

* cited by examiner

*Primary Examiner* — Brian P Werner
(74) *Attorney, Agent, or Firm* — Dirk Brinkman; Gene Vinokur

(57) ABSTRACT

A location and orientation in an environment is determined by first acquiring a real omni-directional image of an unknown skyline in the environment. A set of virtual omni-directional images of known skylines are synthesized from a 3D model of the environment, wherein each virtual omni-directional image is associated with a known location and orientation. The real omni-directional image with each virtual omni-directional images to determine a best matching virtual omni-directional image with the associated known location and orientation.

21 Claims, 5 Drawing Sheets

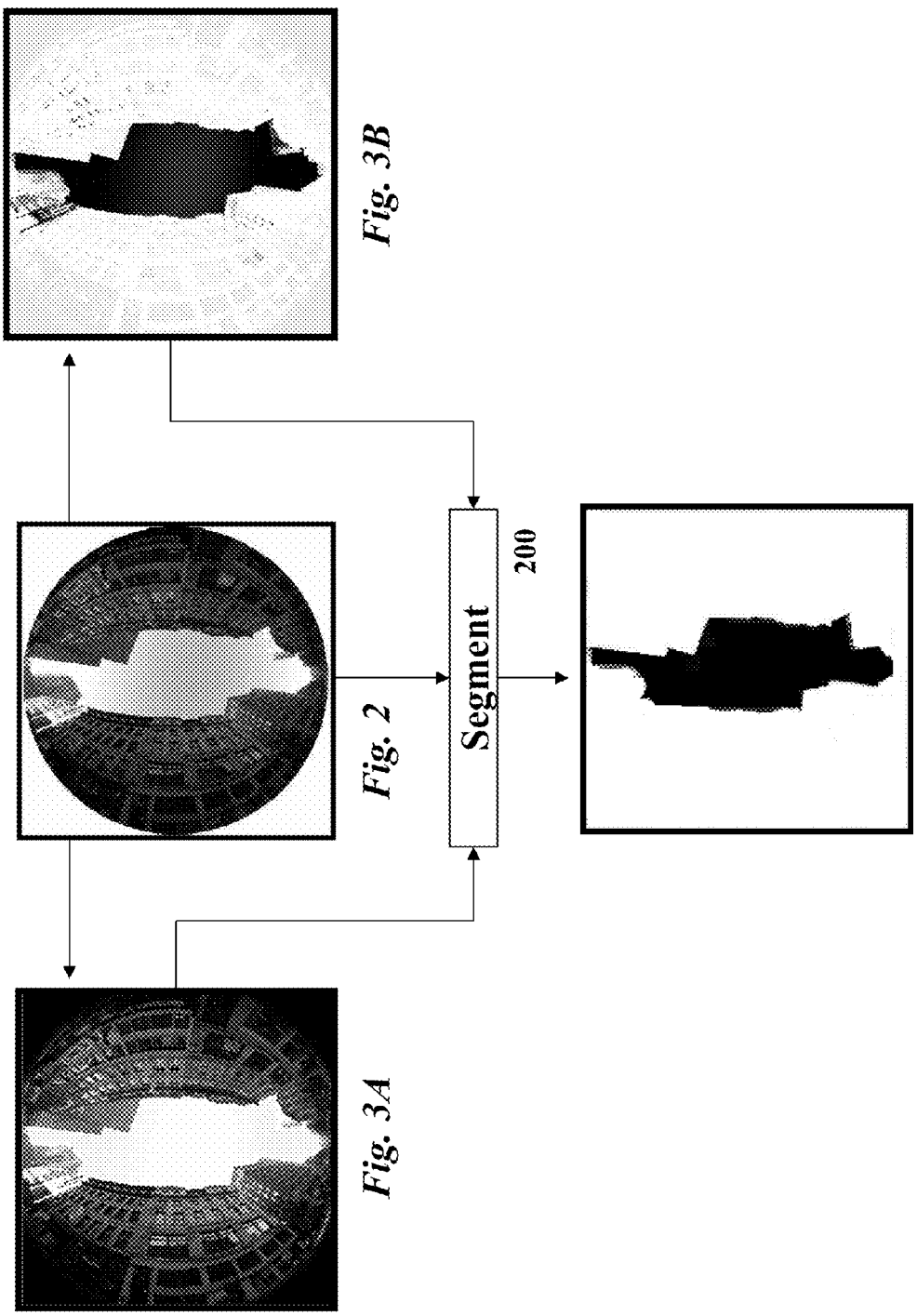

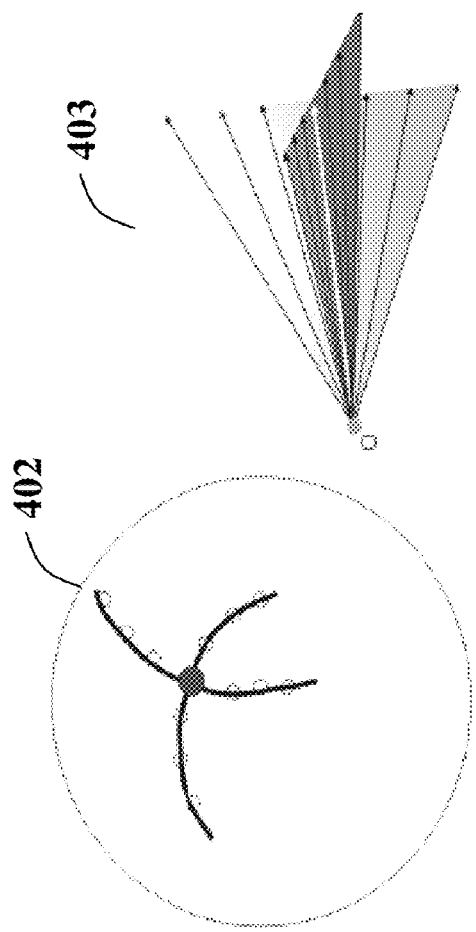
*Fig. 4C*
*Fig. 4B*
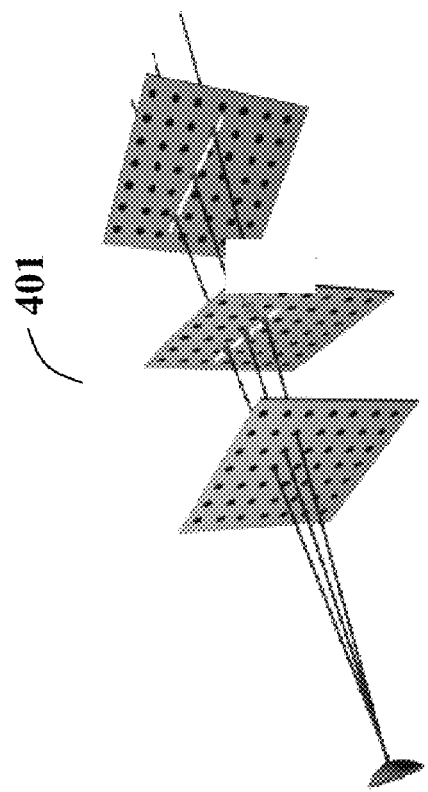
*Fig. 4A*

METHOD FOR DETERMINING A LOCATION FROM IMAGES ACQUIRED OF AN ENVIRONMENT WITH AN OMNI-DIRECTIONAL CAMERA

BACKGROUND OF THE INVENTION

It is often desired to determine one's location, for example when driving. One way to do this is to use a global positioning system (GPS). Unfortunately, GPS has limitations because the signals are broadcasted at 500 watts from satellites about 12,000 miles up. Signals from four satellites are required for normal operation. The signals can be obstructed by buildings, and even foliage. This is called the urban canyon problem. In mobile automotive GPS receivers, metallic features in windshields, such as defrosters, or window tinting films can act as a Faraday cage, further degrading reception.

Therefore, it is desired to use computer vision techniques. In computer vision applications, images are analyzed to determine poses, i.e., location and orientation. Pose estimation, although extremely challenging due to several degeneracy problems and inaccurate feature matching, is well known in computer vision. However, most conventional solutions are only proven on a small scale, typically in a well controlled environment.

The following method are known for inferring geolocation from images, Hays et al., "Im2gps: estimating geographic images," CVPR, 2008, Robertson et al., "An image-based system for urban navigation," BMVC, 2004, Yeh et al., "Searching the web with mobile images for location recognition," CVPR, 2004, and Zhang et al., "Image based localization in urban environments," 3DPVT, 2006.

Another system method uses an infrared camera and a 3D model generated from an aerial laser survey, Meguro et al., "Development of positioning technique using omni-directional IR camera and aerial survey data," Advanced Intelligent Mechatronics, 2007.

That system requires an expensive infrared camera, which makes it impractical for large-scale deployment in consumer oriented applications, such as vehicle or hand-held devices. Their camera is not an omni-directional camera. To provide a partial 360° view primary and secondary mirrors are placed directly in the optical path between the scene and camera. The mirrors obscure a large central portion of the infrared images.

The method requires a high-resolution 3D digital surface model (DSM) is used to construct "restoration images." The DSM is represented in a global geographic coordinate system converted into an Earth Centered Earth Fixed (the ECEF) Cartesian coordinates, and then into East North Up (ENU) coordinates in which the survey position is the origin.

The method unwraps the infrared images into a rectangular panorama, from which edges are extracted to generate a linear profile of the surrounding buildings. They use an azimuth projection specialized for their camera design. The profile is then correlated with the profiles in the restoration images. Neither the unwrapped infrared profiles nor the profiles in the restoration images directly reflect the actual skyline. As a result, their approach can lead to potential inaccuracies when the camera is not vertically aligned. Their angle of view is restricted to 20~70 degrees, and is limited to only provide a 2D location and 1D orientation (x, y, θ).

In addition, they require accurate intracamera parameters and an accurate method of projection. With the IR camera, it is necessary to have infrared rays emitted in certain patterns. That makes it a challenge to determine a technique for capturing images of cyclical patterns used in camera calibration. Hence, a highly specialized calibration jig with thermal point sources arranged inside is required, which further stands in the way of mass deployment in a consumer market.

SUMMARY OF THE INVENTION

The embodiments of the invention provide a method for determining a 6D location and orientation in an environment from an image acquired of the environment with an omni-directional visible light camera, and untextured 3D models of the environment. The camera is oriented vertically to acquire images of, for example, a skyline in an urban setting.

In the urban setting, the skyline is generally unique when observed from a particular viewpoint, i.e., location and orientation. Therefore, the method extracts the skyline from the image and compares the extracted skyline to synthetic skylines in virtual omni-directional images synthesized from the 3D model. By matching the skylines, localization with sub-meter accuracy can be achieved, which can be much better than GPS localization, particularly in an urban setting.

The method can generate the virtual image in real time, using well known database, such as Google Earth, which is a virtual globe, map and geographic information program. Google Earth maps the Earth by the superimposition of images obtained from satellite imagery, aerial photography and geographic information systems (GIS). For many major cities, 3D models of buildings are available, either photorealisticly, with complex polygons and surface images, or as coarse gray-scale models for computers that may not have the capability of processing photorealistic models.

The method can take advantage of photorealistic building details in the texture of images to enhance the precision of the location and orientation estimates; whereas IR cameras cannot image such details.

The embodiments of the invention can easily access these models using wireless communication links, and synthesize the virtual images in real time to provide location techniques for vehicles, or anyone carrying a single omni-directional camera equipped with a processor to perform the steps of the method.

BRIEF DESCRIPTION OF THE DRAWINGS

FIG. 2 is a real image of a skyline acquired using an omni-directional camera according to embodiments of the invention;

FIG. 3A-3B are respectively background and foreground likelihood images segmented from the image of FIG. 2;

FIG. 3C is a segmented image;

FIGS. 4A-4C are schematics of a conventional calibration procedure according to embodiments of the invention;

DETAILED DESCRIPTION OF THE PREFERRED EMBODIMENT

Figure 1:
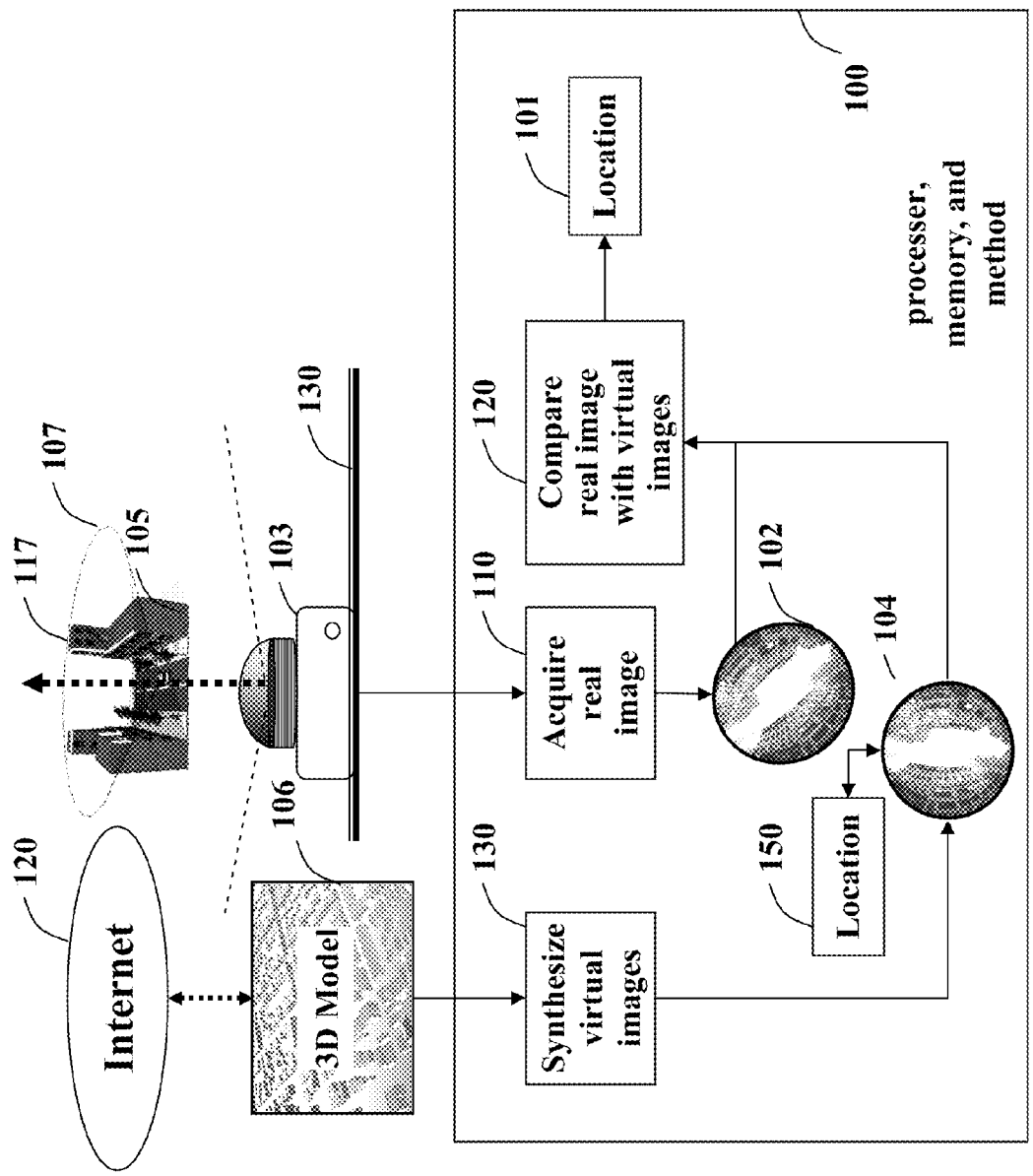
FIG. 1 is a schematic of a system and method for determining a 6D location and orientation in an environment according to embodiments of the invention.

As shown in FIG. 1, embodiments of our invention provide a method and system 100 for determining a 6D location and orientation 101 in an environment 105 from a real omni-directional image 102 acquired 110 of a skyline 106 in the environment with an omni-directional visible light camera 103 at an unknown location and orientation. The optical axis 117 of the camera is oriented substantially vertical to a ground plane, which may be planar or not. The camera acquires images of the skyline in the environment. The camera can be mounted in a vehicle, or the user of the camera can just simply place the camera back on the ground plane 130.

The real image 102 is compared 120 with virtual omni-directional images 104 synthesized 130 from a 3D model 106 of the environment for known locations and orientations. The 3D model can be acquired in real-time using the Internet 120 or the 3D model can be stored in a memory of the system.

Sky Detection

As shown in FIG. 2, the real image is circular because the camera has an omni-directional (fisheye) lens. Sky detection is performed as a segmentation of foreground pixels, e.g. buildings, from the background pixels, e.g. sky. To perform segmentation, we need to have likelihoods or probabilities for every pixel, which denotes its similarity with foreground and background classes. We learn these likelihoods for buildings and sky classes using image features such as intensity, color, gradients, lines, vanishing points, etc. In the circular image of FIG. 22, we show the likelihoods for sky in FIG. 3A and buildings in FIG. 3B. These likelihoods are used in segmentation 200 to generate a binary image denoting the foreground and background classes in FIG. 3C. Although, the example herein is in terms of an urban environment, the invention can be worked in any arbitrary environment that has a distinctive 'skyline,' including indoor environments, where the background could be a tall ceiling, and corresponding 3D models are available.

We use a "graphcut" procedure to perform the segmentation. In a graph, pixels are represented by nodes which are connected to two terminal nodes called source and sink, which respectively represent buildings and sky. The cost of edges connecting the nodes is proportional to their likelihoods shown in FIGS. 3A and 3B. In addition, adjacent nodes are also connected to model "smoothness" that generally exists in natural images, i.e., adjacent pixels tend to belong to the same class. A "cut" through the edges partitions the pixels represented by the graph into two sets, namely background and foreground. Effectively, the foreground pixels adjacent to the background pixels along the cut define the skyline.

If the graph is considered as an energy image, a minimum cut yields an energy-minimizing partitioning because the cut follows edges with smallest energies. Conventionally, this is done with a maxflow procedure.

Formally, let G=(V, E) be a directed graph with non-negative edge weights, and two special nodes, namely, the source S and the sink T. The cut partitions the set of vertices in V into two disjoint sets $V_S$ and $V_T$. The nodes S and T correspond to background (sky) and the foreground (buildings).

We use quadratic pseudo-Boolean functions for representing and learning the parameters in our energy function. We obtain the unary likelihood for sky and foreground pixels using the features of the corresponding pixels. We estimate a Gaussian model for the classes of foreground and background pixels, and determine the mean and covariance from manually segmented "ground truth images." We believe our skyline detection from omni-directional images is novel.

Calibration

The main goal of our calibration is to map the pixels in an image to corresponding 3D projection rays in space. To calibrate our omni-directional camera, we acquire three images of a calibration grid 400, as shown in FIG. 4A. The images are taken from unknown viewpoints so that the pixels in the three images correspond to different 3D points in the calibration grid. These 3D points are obtained in three different coordinate systems. These points are collinear if the pixels are in the same coordinate system. This constraint enables us to determine the 'motion' between the views, and eventually the projection rays for the image pixels.

In a practical calibration, it is not possible to extract the projection rays for every pixel. However, nomography or bilinear interpolation can determine projection rays for other pixels. In one method, we interpolate 3D points on the second and third grids. It is possible to compute the rays, which are coplanar from the first grid, and impose collinearity constraint on the interpolated 3D points in the second and the third grid.

We also provide a method for mapping in a reverse manner, i.e., determining the pixel corresponding to a projection ray. To determine the pixel corresponding to a given projection ray, we randomly select two sets of six or more rays, where the rays in each set are collectively coplanar with the given ray. It is well known that lines approximately project as conics 402 on the omni-directional images, as shown in FIG. 4B.

FIG. 4C shows how we use virtual planes 403 to determine the projection between a given ray and the corresponding pixel in the image. We determine the pixels corresponding to all the randomly generated rays in the image using bilinear interpolation. The coplanar rays map to pixels on conic sections as shown in FIG. 4B. Using this property, we fit ellipses to the two sets of pixels and intersect the ellipses to obtain the correct pixel After the mapping between pixels and their corresponding projection rays is determined, we store the rays in a "calibration ray-table," which is used for synthesizing virtual omni-directional images.

Image Synthesis

Figure 5B:
FIGS. 5A-5B are respectively a 3D model and an aerial view of the environment according to embodiments of the invention.
Figure 5A:
Figure 5D:
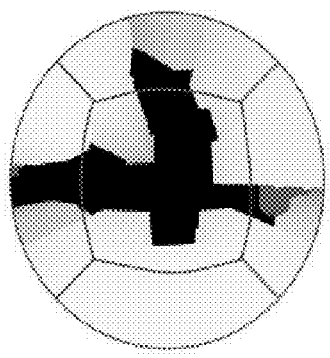
FIG. 5C-5D are respectively perspective and omni-direction images according to embodiments of the invention.
Figure 5C:
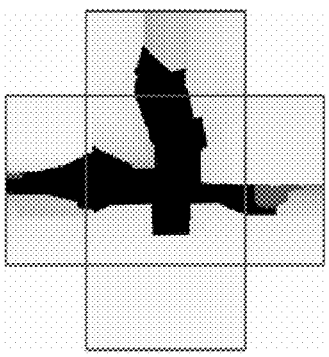

FIGS. 5A-5E show how virtual omni-directional image are synthesized. FIG. 5A shows the 3D model 106 of the environment, and FIG. 5B is a corresponding aerial image. Graphic processor units (GPUs), executing graphic commands written in languages such as OpenGL and DirectX, do not support non-linear projections, such as projections from omni-directional images. Therefore, we first generate five binary linear, perspective images as shown in FIG. 5C.

Because we use a coarse 3D model without any texture, we render the 3D model as a binary image wherein the background sky pixels are black, and the foreground pixels are white as shown in FIGS. 5C-5D.

Figure 5E:
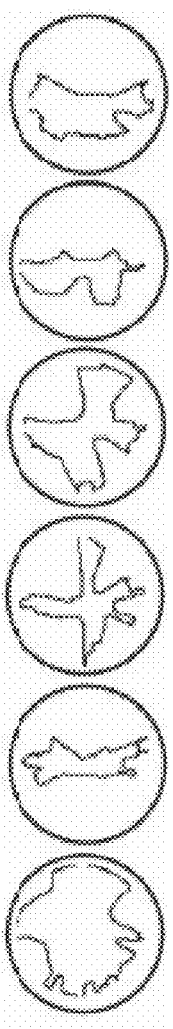
FIG. 5E are example skylines to be matched according to embodiments of the invention.

We use our calibrated ray-table, which we obtain using our conventional calibration procedure, to map the perspective images, 5C, to virtual omni-directional images as shown in FIG. 5D. The virtual images, like the real images, are circular. FIG. 5D shows the corresponding virtual image that is a combination of the perspective images, and FIG. 5E shows example skylines extracted from the virtual images for different locations.

Our ray-calibrated view synthesis has the advantage that it does not introduce distortions that would arise with a parametric lens model. In addition, a pixel shader program is implemented in the GPU to generate the omni-directional images at high rate. This enables us to generate the virtual images from the 3D model in real time, which do not need to be stored by the system.

Matching

Figure 6B:
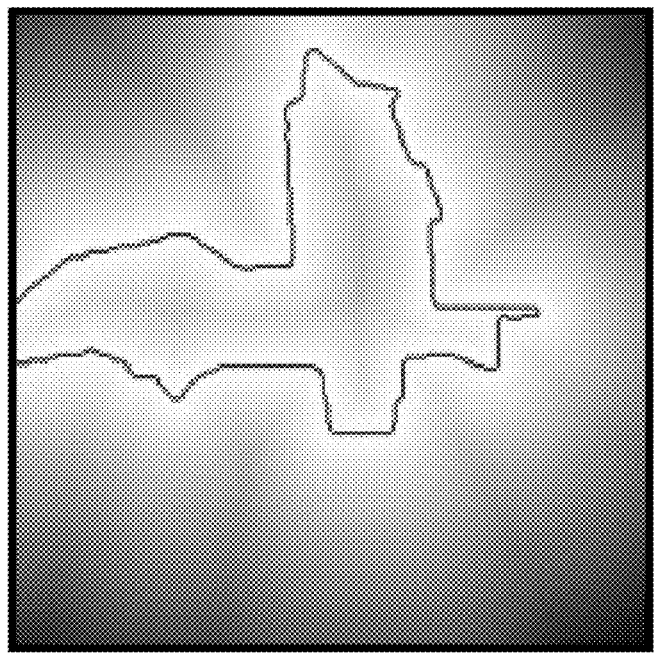
FIGS. 6A-6B are matching real and virtual images.
Figure 6A:

We show the skyline, extracted after segmentation 200, in a real image as shown in FIG. 6A. FIG. 6B shows the best matching virtual image. Because the skyline from both the real image and the virtual image have a high quality, a chamfer distance can be used to match the skyline. The chamfer distance is an average nearest distance for the skyline in the real and virtual images.

During the chamfer matching, we vary the pose parameters for the virtual omni-directional camera, and obtain virtual images for various locations in the 3D model. We use a multi-resolution technique. We start with synthesizing and matching virtual omni-directional images that are distributed at intervals of five meters, and refine the location until we have achieved a positive match that is precise up to several centimeters.

EFFECT OF THE INVENTION

We obtained highly accurate matching that demonstrates that it is possible to outperform GPS measurements in urban environment, which are known to be extremely problematic for most commercially available GPS units.

To our best knowledge, we are not are not aware of any work in computer vision that synthesizes omni-directional images from 3D models for location estimation.

In contrast of the expensive ($5000+) specially constructed infrared camera of Meguro et al., we use a relatively inexpensive (~$30) visible light omni-directional camera. Instead of difficult to obtain 3D laser based aerial models, we use models readily on the Web for most urban localities around the world. We use a conventional calibration model, instead of a highly specialized jig.

Meguro et al. cannot synthesize their restoration images in real time. They use an azimuth projection specially designed for their camera, while our projection is generic. The projection can be equiangular, radial, or sinusoidal, and, unlike Meguro, can be used with arbitrary combinations of cameras, lenses and mirrors.

Their comparison is between edge features of unwrapped profiles instead of actual images. We do not have an obstructing mirror in the view. Their approach only provides a 2D location and ID orientation (x, y, θ). We provide a complete 6D pose and orientation around all three axes, this is very crucial when the terrain is not planar, and the exact orientation of the camera is difficult to determine. Their calibration is highly specialized with thermal sources.

The accuracy of our method can be increased further to a few centimeters using more important features on the buildings, edges, lines, color, gradients from windows, doors, street signs, etc. These features are not present in IR images. Thus, our technology can outperform the localization with IR cameras.

In contrast to IR images, the use of optical images enables us to "paint" our 3D models by applying the texture of the real images, and track changes in the scene over time when multiple real images are acquired.

Although our 3D models are coarse, and edges can be lost due to variations in ambient light and weather conditions, these ambiguities can be resolved using other computer vision techniques, such as interest point matching and tracking between consecutive images, structure from motion techniques, Kalman filtering, and other prior information based on street map information.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a location and orientation in an environment, comprising, a processor for performing steps of the method, comprising the steps of:
    acquiring a real omni-directional image of an unknown skyline in the environment from an unknown location and unknown orientation in the environment;
    synthesizing a set of virtual omni-directional images from a 3D model of the environment, wherein each virtual omni-directional image is associated with a known skyline, a known location and a known orientation; and
    comparing the real omni-directional image with each virtual omni-directional images to determine a best matching virtual omni-directional image with the associated known location and orientation that correspond to the unknown location and orientation.

2. The method of claim 1, further comprising:
    extracting features from pixels in the real and virtual images, and the comparing is based on the features.

3. The method of claim 1, wherein the environment is urban.

4. The method of claim 1, wherein the omni-directional camera is arranged in a vehicle, and the 3D model is acquired in real time using a communication network as the virtual images are generated.

5. The method of claim 1, wherein the synthesizing is performed in real time from the 3D model acquired in real-time using a network.

6. The method of claim 2, wherein the features include pixel intensities.

7. The method of claim 1, further comprising:
    segmenting the real image using the features into foreground and back ground pixels, and the background pixels correspond to a sky, and wherein the foreground pixels adjacent to the back ground pixels define a skyline.

8. The method of claim 1, further comprising:
    calibrating the omni-directional camera using a generic imaging model.

9. The method of claim 1, wherein the synthesizing further comprises:
    generating a set of perspective images for each virtual image from the 3D model; and
    combining the perspective images to form the virtual omni directional image.

10. The method of claim 1, wherein each virtual omni-directional image is a binary image.

11. The method of claim 2, wherein the comparing uses a chamfer distance.

12. The method of claim 1, wherein each virtual omni-directional image is synthesized at multiple resolutions.

13. The method of claim 2, wherein the features include color, gradients, lines and vanishing points.

14. The method of claim 8, wherein the generic calibration model can be applied to arbitrary combinations of cameras, mirrors and lenses.

15. The method of claim 1, wherein the set of virtual omni-directional images are synthesized in real time.

16. The method of claim 1, wherein the environment is an urban setting.

17. The method of claim 1, wherein the environment is indoor.

18. The method of claim 1, wherein the real omni-directional image is acquired using visible light.

19. The method of claim 7, wherein the segmenting is performed using a graphcut.

20. The method of claim 8, wherein the synthesizing uses a generic projection.

21. A system for determining a location and orientation in an environment, comprising:
- an omni-directional camera configured to acquire a real omni-directional image of an unknown skyline in the environment from an unknown location and unknown orientation in the environment;
- means for synthesizing a set of virtual omni-directional images from a 3D model of the environment, wherein each virtual omni-directional image is associated with a known skyline, a known location, and a known orientation; and
- means for comparing the real omni-directional image with each virtual omni-directional images to determine a best matching virtual omni-directional image with the associated known location and known orientation that correspond to the unknown location and unknown orientation.

* * * * *